(12) United States Patent
Ikenoue et al.

(10) Patent No.: US 11,697,062 B2
(45) Date of Patent: *Jul. 11, 2023

(54) INFORMATION PROCESSING APPARATUS AND WARNING PRESENTATION METHOD

(71) Applicant: Sony Interactive Entertainment Inc., Tokyo (JP)

(72) Inventors: Shoichi Ikenoue, Chiba (JP); Yuji Nakamura, Tokyo (JP); Yoshihiko Suwa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 17/114,539

(22) Filed: Dec. 8, 2020

(65) Prior Publication Data

US 2021/0086069 A1 Mar. 25, 2021

Related U.S. Application Data

(63) Continuation of application No. 16/655,501, filed on Oct. 17, 2019, now Pat. No. 10,888,772, which is a
(Continued)

(30) Foreign Application Priority Data

Dec. 14, 2015 (JP) ................................. 2015-243593

(51) Int. Cl.
*A63F 13/533* (2014.01)
*A63F 13/213* (2014.01)
(Continued)

(52) U.S. Cl.
CPC ............ *A63F 13/213* (2014.09); *A63F 13/25* (2014.09); *A63F 13/53* (2014.09); *A63F 13/533* (2014.09);
(Continued)

(58) Field of Classification Search
CPC ...... A63F 13/213; A63F 13/53; A63F 13/533; A63F 2300/69; A63F 2300/8082; G06F 3/0481; G06T 19/006
See application file for complete search history.

(56) References Cited

U.S. PATENT DOCUMENTS 7,330,197 B2 2/2008 Kobayashi
9,092,125 B2 7/2015 Michaelis
(Continued)

FOREIGN PATENT DOCUMENTS

CN 101064773 A 10/2007
CN 102214040 A 10/2011
(Continued)

OTHER PUBLICATIONS

The First Office Action for corresponding CN Application No. 201680071684.1, 12 pages, dated Mar. 17, 2021.
(Continued)

*Primary Examiner* — Corbett B Coburn
(74) *Attorney, Agent, or Firm* — Matthew B. Dernier, Esq.

(57) ABSTRACT

Methods and apparatus provide for: performing information processing on the basis of data received from a device that detects a user position; generating an image to be displayed as a result of the information processing; and determining that the user needs to be warned when the user position indicates that the user moves out of a play area set in an object space in reference to a detection field of the device, and to cause the image generating section to superpose a warning image on the image to be displayed, where the determining includes setting positions of boundary surfaces of the play area with respect to the detection field of the device within a predetermined range from the user.

21 Claims, 12 Drawing Sheets

Related U.S. Application Data continuation of application No. 15/773,447, filed as application No. PCT/JP2016/086444 on Dec. 7, 2016, now Pat. No. 10,486,062.

(51) Int. Cl.

| | |
|---|---|
| *A63F 13/53* | (2014.01) |
| *G06F 3/0481* | (2022.01) |
| *A63F 13/25* | (2014.01) |
| *G02B 27/00* | (2006.01) |
| *A63F 13/655* | (2014.01) |
| *G02B 27/01* | (2006.01) |
| *G06T 7/70* | (2017.01) |
| *G06T 19/00* | (2011.01) |

(52) U.S. Cl.
CPC ............ *A63F 13/655* (2014.09); *G02B 27/00* (2013.01); *G02B 27/01* (2013.01); *G06F 3/0481* (2013.01); *G06T 7/70* (2017.01); *G06T 19/006* (2013.01); *A63F 2300/69* (2013.01); *A63F 2300/8082* (2013.01)

(56) References Cited

U.S. PATENT DOCUMENTS

| | | | |
|---|---|---|---|
| 9,599,818 B2 | 3/2017 | Yamagishi | |
| 9,690,371 B2 | 6/2017 | Saito | |
| 10,192,360 B2 | 1/2019 | Osawa | |
| 10,486,062 B2* | 11/2019 | Ikenoue | A63F 13/533 |
| 10,888,772 B2* | 1/2021 | Ikenoue | G02B 27/0093 |
| 2004/0110565 A1* | 6/2004 | Levesque | A63F 13/10 |
| | | | 463/36 |
| 2005/0123171 A1 | 6/2005 | Kobayashi | |
| 2011/0248927 A1 | 10/2011 | Michaelis | |
| 2013/0169425 A1 | 7/2013 | Trent | |
| 2013/0328928 A1 | 12/2013 | Yamagishi | |
| 2015/0062000 A1 | 3/2015 | Saito | |
| 2015/0094142 A1 | 4/2015 | Stafford | |
| 2015/0248772 A1* | 9/2015 | Gove | G06V 10/147 |
| | | | 348/158 |
| 2015/0265920 A1 | 9/2015 | Kim | |
| 2015/0288883 A1 | 10/2015 | Shigeta | |
| 2017/0182412 A1 | 6/2017 | Osawa | |
| 2017/0262047 A1 | 9/2017 | Saito | |
| 2018/0318704 A1 | 11/2018 | Shoichi | |

FOREIGN PATENT DOCUMENTS

| | | |
|---|---|---|
| CN | 102712285 A | 10/2012 |
| CN | 102968353 A | 3/2013 |
| CN | 104071119 A | 10/2014 |
| CN | 104680557 A | 6/2015 |
| CN | 104991340 A | 10/2015 |
| JP | 2005165848 A | 6/2005 |
| JP | 2007156561 A | 6/2007 |
| JP | 2012178061 A | 9/2012 |
| JP | 2013164737 A | 8/2013 |
| JP | 2013257762 A | 12/2013 |
| JP | 2014119786 A | 6/2014 |
| JP | 5580855 B2 | 8/2014 |
| JP | 2014157433 A | 8/2014 |
| JP | 2015045805 A | 3/2015 |
| JP | 2015116336 A | 6/2015 |
| JP | 2015156131 A | 8/2015 |
| JP | 6363587 B2 | 7/2018 |
| WO | 2015047775 A1 | 4/2015 |

OTHER PUBLICATIONS

Notification of Reasons for Refusal for corresponding JP Application No. 2021065802, 7 pages, dated Jan. 31, 2022.
Wapa 2, "*** Back Technology," Hatena Blog , Internet <URL:https://wapa.hatenablog.jp/entry/20061210/p1 > Wii Sports, 5 pages, Dec. 10, 2006 (for relevancy see Notification of Reason for Refusal for JP Application No. 2021065802 cited above).
International Search Report for corresponding PCT Application No. PCT/JP2016/086444, 3 pages, dated Jan. 10, 2017.
Notification of Reason for Refusal for corresponding JP Application No. 2015243593, 5 pages, dated Feb. 27, 2018.
International Preliminary Report on Patentability and Written Opinion for corresponding PCT Application No. PCT/JP2016/086444, 13 pages, dated Jul. 20, 2017.
Extended European Search Report for corresponding EP Application No. 16875495.0, 7 pages, dated Nov. 6, 2018.
Notification of Reasons for Refusal for corresponding JP Application No. 2018-122892, 14 pages, dated Aug. 20, 2019.
Notice of Reasons for Refusal for corresponding JP Application No. 2019214957, 5 pages, dated Oct. 19, 2020.

* cited by examiner

INFORMATION PROCESSING APPARATUS AND WARNING PRESENTATION METHOD

CROSS REFERENCE TO RELATED APPLICATIONS

This application is a continuation of U.S. patent application Ser. No. 16/655,501, accorded a filing date of Oct. 17, 2019 (allowed), which is a continuation of U.S. patent application Ser. No. 15/773,447, accorded a filing date of May 3, 2018, issued U.S. Pat. No. 10,486,062 on Nov. 26, 2019, which is a National Stage application claiming priority to International Application No. PCT/JP2016/086444, filed on Dec. 7, 2016, which claims priority to JP 2015-243593, filed Dec. 14, 2015, the entire disclosures of which are hereby incorporated by reference.

TECHNICAL FIELD

The present invention relates to an information processing apparatus that performs information processing on the basis of captured images, as well as to a warning presentation method carried out by the information processing apparatus.

BACKGROUND ART

Today, video games may be played by a user watching a display screen of a head-mounted display (called the HMD hereunder) worn on the head and connected to a game machine (e.g., see PTL 1). If the position and posture of the user's head are acquired so that images of a virtual world are presented to the user in such a manner that the field of view is varied in accordance with the acquired direction of the user's face for example, it is possible to produce a situation where the user feels as if he or she is actually in the virtual world. Generally, the user's position and posture are acquired through analysis of visible or infrared light images captured of the user or on the basis of measurements taken by motion sensors inside the HMD, for example.

CITATION LIST

Patent Literature

[PTL 1] Japanese Patent No. 5580855

SUMMARY

Technical Problem

The techniques for performing any kind of information processing on the basis of captured images are predicated on the assumption that a target object such as a user is within the angle of view of a camera. However, because the user wearing the HMD is unable to view the outside world, the user may get disoriented or may be immersed in the game so much that the user may move to an unexpected place in the real space without noticing it. Such an eventuality places the user out of the camera angle of view, which may lead to disrupting the ongoing information processing or worsening its accuracy. Moreover, the user may remain unaware of the cause of such irregularities. The more aware the user is of what is happening in the real world such as the user's positional relations to the camera, the more stable the accuracy of information processing remains. The dilemma is that the world view of the virtual world created by use of the HMD is that much likely to be disrupted at the same time.

The present invention has been made in view of the above circumstances. An object of the invention is therefore to provide techniques for optimizing the balance between the aspect of entertainment provided by the HMD and the accuracy of information processing.

Solution to Problem

According to one aspect of the present invention, there is provided an information processing apparatus including: an information processing section configured to perform information processing on the basis of an image of a target object detected from a captured image obtained by an imaging device through video imaging of the target object; an image generating section configured to generate data of the image to be displayed as a result of the information processing; a warning state determining section configured to determine that a user needs to be warned when the target object gets out of a play area set in an object space in reference to a field of view of the imaging device, the warning state determining section further causing the image generating section to superpose a warning image on the image to be displayed; and an output data transmitting section configured to transmit the data of the image generated by the image generating section to a display device. The warning state determining section varies a position of boundary surfaces of the play area with respect to boundary surfaces of the field of view in accordance with a direction in the object space.

According to another aspect of the present invention, there is provided a warning presentation method including: a step of performing information processing on the basis of an image of a target object detected from a captured image obtained by an imaging device through video imaging of the target object; a step of generating data of the image to be displayed as a result of the information processing; a step of determining that a user needs to be warned when the target object gets out of a play area set in an object space in reference to a field of view of the imaging device; a step of superposing a warning image on the image to be displayed according to the determination; and a step of transmitting the data of the generated image to a display device. The determining step varies a position of boundary surfaces of the play area with respect to boundary surfaces of the field of view in accordance with a direction in the object space.

Incidentally, if other combinations of the above-outlined composing elements or the above expressions of the present invention are converted between different forms such as a method, an apparatus, a system, a computer program, and a recording medium with a computer program recorded thereon, they still constitute an effective embodiment of this invention.

Advantageous Effect of Invention

According to the present invention, the user wearing the HMD can enjoy a world of expression while being minimally aware of the constraints of the real world.

DESCRIPTION OF EMBODIMENT

Figure 1:
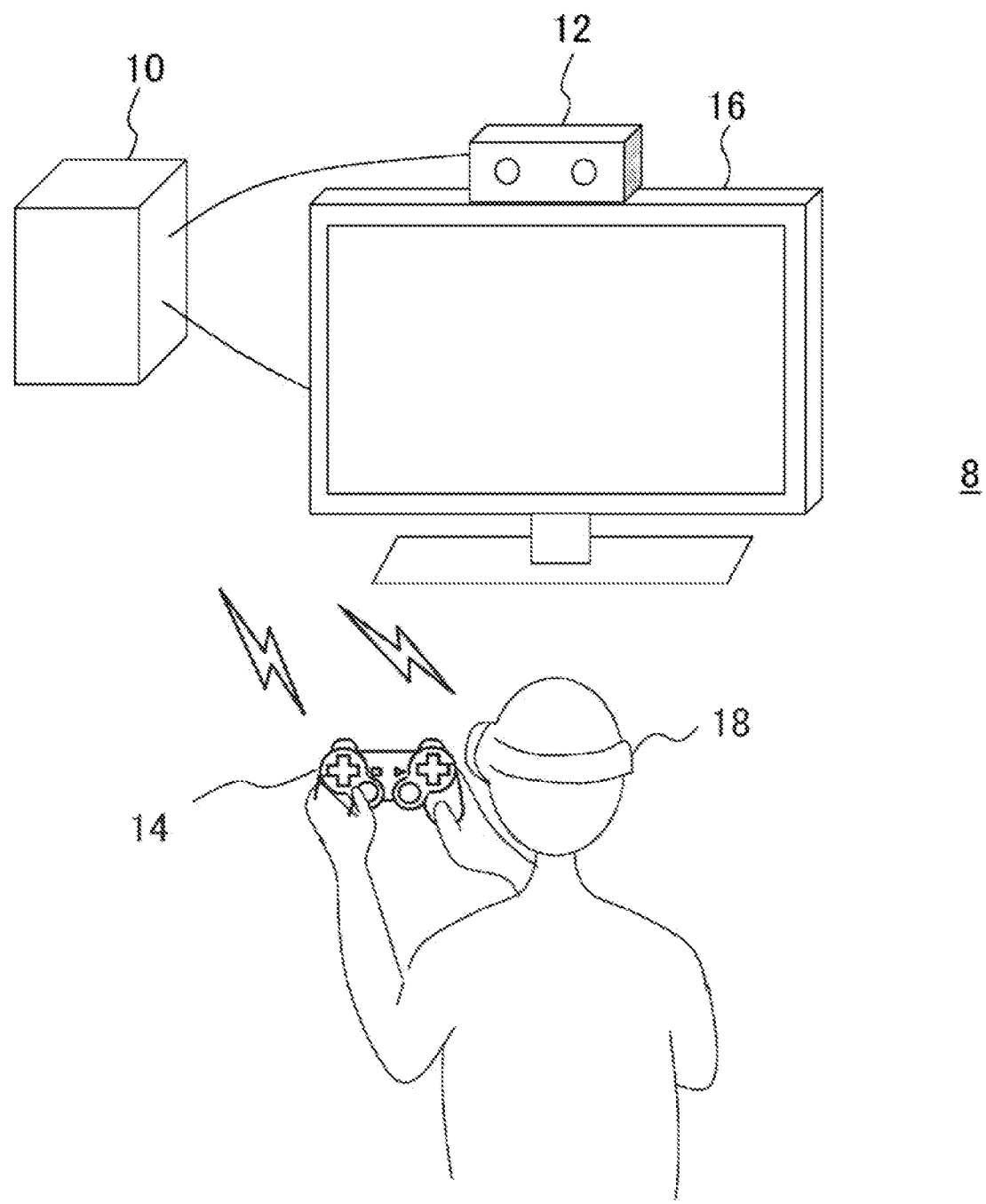
FIG. 1 is a schematic diagram depicting a typical configuration of an information processing system to which one embodiment of the present invention may be applied.

FIG. 1 depicts a typical configuration of an information processing system to which one embodiment of the present invention may be applied. An information processing system 8 includes an imaging device 12 that images a target object, an information processing apparatus 10 that performs information processing on the basis of captured images, a flat-screen display 16 and an HMD 18 for displaying the image obtained as a result of the information processing, and an input device 14 operated by the user.

The information processing apparatus 10 may be connected with the imaging device 12, input device 14, flat-screen display 16, and HMD 18 either by cable or by known wireless communication technology such as Bluetooth (registered trademark). Depending on the information processing carried out by the information processing apparatus 10, the flat-screen display 16 may be omitted. The external shapes of the apparatus and devices are not limited to what is illustrated. Two or more of such devices may be integrated in a single device or apparatus. For example, the information processing apparatus 10, input device 14, and flat-screen display 16 may be implemented in a mobile terminal.

The imaging device 12 includes a camera that images the target object such as the user at a predetermined frame rate and a mechanism that generates output data of captured images by performing known processes such as demosaicing on an output signal from the camera, before sending the output data to the information processing apparatus 10. A camera is provided including visible light sensors used in common digital cameras or digital video cameras, such as charge-coupled device (CCD) sensors or complementary metal oxide semiconductor (CMOS) sensors. The imaging device 12 may include either a single camera or a so-called stereo camera that has two cameras disposed right and left at a known distance apart as illustrated.

As another alternative, the imaging device 12 may be formed by combining a monocular camera with a device that emits reference light such as infrared rays to the target object and measures reflected light therefrom. Where the stereo camera or the reflected light measuring mechanism is provided, it is possible to find the position of the target object in a three-dimensional real space. This allows the information processing apparatus 10 to perform information processing or the display device to give image display in a more diverse manner. It is well known that the stereo camera determines the distance from the camera to the target object by resorting to the principle of triangulation using stereoscopic images captured from right and left points of view. Also well known are the techniques for determining the distance from the camera to the target object through measurement of reflected light on a time-of-flight (TOF) basis or by use of a pattern projection method.

What follows is primarily a description of the manner in which the imaging device 12 captures a stereoscopic image. However, this is not limitative of how the present invention is practiced. At least one camera need only be included in the imaging device 12. The information processing apparatus 10 performs necessary information processing using the data sent from the imaging device 12 so as to generate output data such as image and audio data. The content of the processing carried out by the information processing apparatus 10 is not limited in particular and may be determined as needed depending on the functions desired by the user or on the content of applications, for example.

The information processing apparatus 10 typically performs known processes such as face detection and tracking on the captured image in order to advance a video game in which appears a character reflecting the movement of the user as the target object or to convert the user's movement into command input for information processing, for example. At this time, markers attached to the input device 14 may be used for acquisition of the movement of the input device 14. Also, multiple markers attached to the external surface of the HMD 18 may be tracked so as to identify the position and posture of the user's head wearing the HMD 18. The HMD 18 may then be caused to display a virtual world as seen from the point of view being moved in keeping with the identified position and posture of the user's head. The output data generated by the information processing apparatus 10 is transmitted at least to the HMD 18.

The HMD 18 is a display device that presents the user wearing it with images on a display panel such as an organic electroluminescence (EL) panel positioned before the user's eyes. For example, parallax images captured from right and left points of view are generated and displayed on a right and a left display region bisecting the display screen so that the images may be viewed stereoscopically. However, this is not limitative of how the present invention is practiced. For example, a single image may be displayed over the entire display screen. Furthermore, the HMD 18 may incorporate speakers or earphones that output sounds to the positions corresponding to the user's ears.

The flat-screen display 16 may be a television set equipped with a display unit that outputs two-dimensional images and speakers that output sounds. For example, the flat-screen display 16 may be a liquid crystal display television set, an organic EL television set, a plasma display television set, or a personal computer (PC) display unit. Alternatively, the flat-screen display 16 may be a display unit of a tablet terminal or a mobile terminal equipped with speakers. The input device 14, when operated by the user, receives requests to start or end processing, to select functions, or to input various commands for example, and supplies the received requests as electrical signals to the information processing apparatus 10.

The input device 14 may be implemented as one or a combination of common input devices such as a game controller, a keyboard, a mouse, a joystick, and a touch pad on the display screen of the flat-screen display 16. The display device 14 may also be equipped with a light-emitting marker arrangement made up of one or a set of light-emitting elements emitting light in a predetermined color. In this case, if the information processing apparatus 10 tracks the movement of the markers using captured images, the movement of the input device 14 itself may be regarded as the user's operation. As another alternative, the input device 14 may be constituted solely by a light-emitting marker and a gripping mechanism attached thereto.

Figure 2:
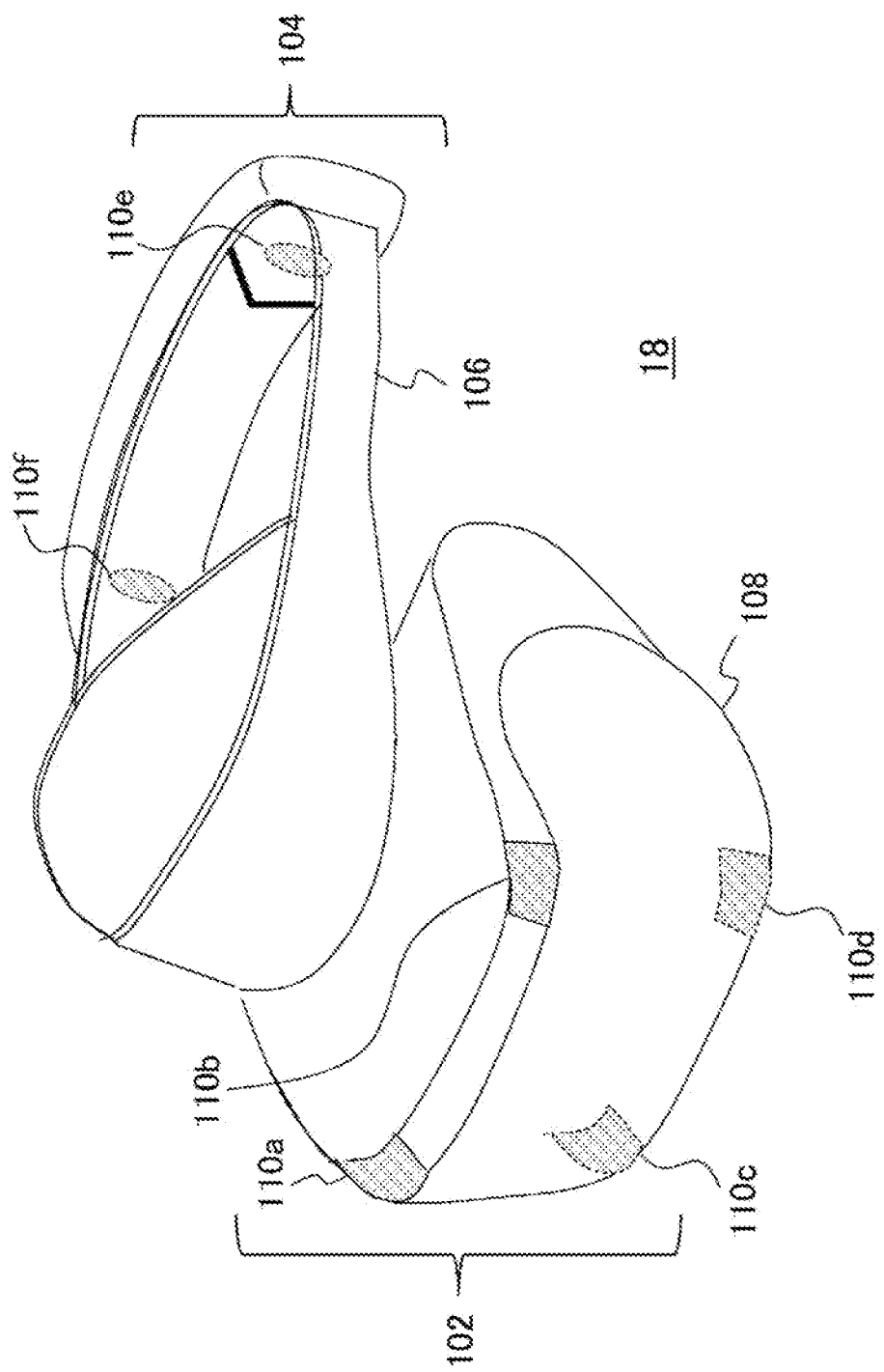
FIG. 2 is a schematic diagram depicting a typical external shape of the HMD of the embodiment.

FIG. 2 depicts a typical external shape of the HMD 18. In this example, the HMD 18 is made up of an output mechanism section 102 and a wearing mechanism section 104. The wearing mechanism section 104 includes a wearing band 106 that implements fixing of the apparatus by the user wearing the wearing band 106 in such a manner that it surrounds the user's head. The wearing band 106 is made of such materials or structured in such a manner that the length of the band is adjustable to accommodate the perimeter of each user's head. For example, the wearing band 106 may be made of an elastic body or may utilize buckles and gears for length adjustment.

The output mechanism section 102 includes a housing shaped to cover both eyes when the user wears the HMD 18. Inside the housing 108 is a display panel facing straight at the user's eyes. Light-emitting markers 110a, 110b, 110c, and 110d are attached to the external surface of the housing 108. Although the number of light-emitting markers or their arrangement is not limited in particular, this embodiment has the light-emitting markers attached to four corners of the housing front of the output mechanism section 102.

Light-emitting markers 110e and 110f are further attached to both sides of the wearing band 106 at the back thereof. With the light-emitting markers arranged in this manner, a moving user facing sideways or backwards relative to the imaging device 12 can still be identified on the basis of the number and the positions of light-emitting markers in the captured image. It is to be noted that the light-emitting markers 110c and 110d under the output mechanism section 102 and the light-emitting markers 110e and 110f outside the wearing band 106 are actually invisible from the point of view of FIG. 2, so that the contours of these light-emitting markers are indicated by dotted lines in the illustration.

Figure 3:
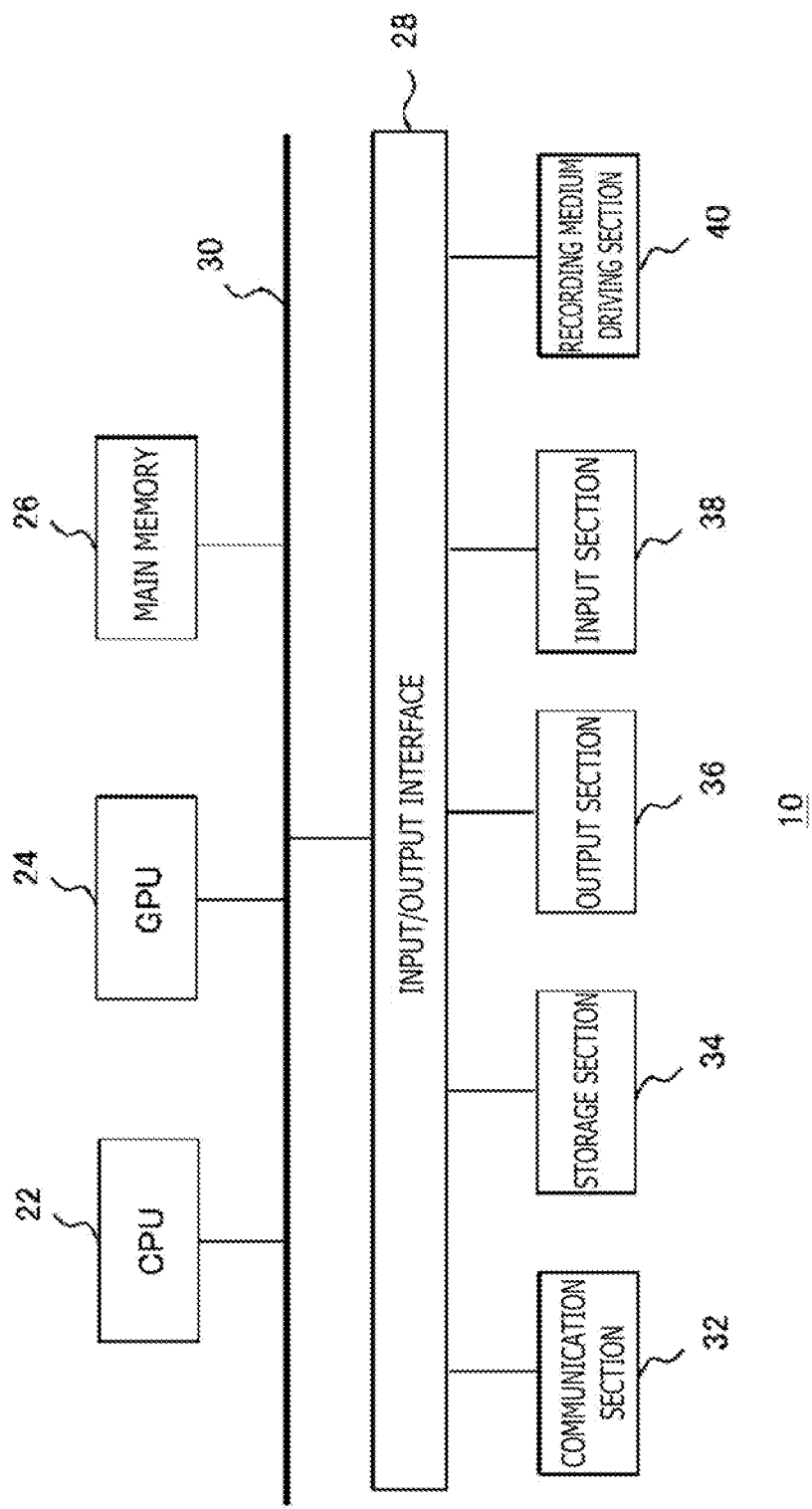
FIG. 3 is a schematic diagram depicting an internal circuit configuration of an information processing apparatus of the embodiment.

FIG. 3 depicts an internal circuit configuration of the information processing apparatus 10. The information processing apparatus 10 includes a central processing unit (CPU) 22, a graphics processing unit (GPU) 24, and a main memory 26. These components are interconnected via a bus 30. The bus 30 is further connected with an input/output interface 28. The input/output interface 28 is connected with a communication section 32 that includes peripheral interfaces such as universal serial bus (USB) and Institute of Electrical and Electronics Engineers (IEEE) 1394 ports and a wired or wireless local area network (LAN) network interface, a storage section 34 such as a hard disk drive or a nonvolatile memory, an output section 36 that outputs data to the flat-screen display 16 and to the HMD 18, an input section 38 that receives input of data from the imaging device 12, input device 14, and HMD 18; and a recording medium driving section 40 that drives removable recording media such as a magnetic disk, an optical disk, or a semiconductor memory.

The CPU 22 controls the entire information processing apparatus 10 by executing an operating system stored in the storage section 34. Also, the CPU 22 executes various programs that were read from removable recording media and loaded into the main memory 26 or have been downloaded through the communication section 32. The GPU 24 has the functions of a geometry engine and a rendering processor. The GPU 24 performs a rendering process in accordance with rendering instructions from the CPU 22 so as to store a display image into a frame buffer, not depicted. The GPU 24 proceeds to convert the display image stored in the frame buffer into a video signal that is output to the output section 36. The main memory 26 is composed of a random access memory (RAM) that stores programs and data necessary for processing.

Figure 4:
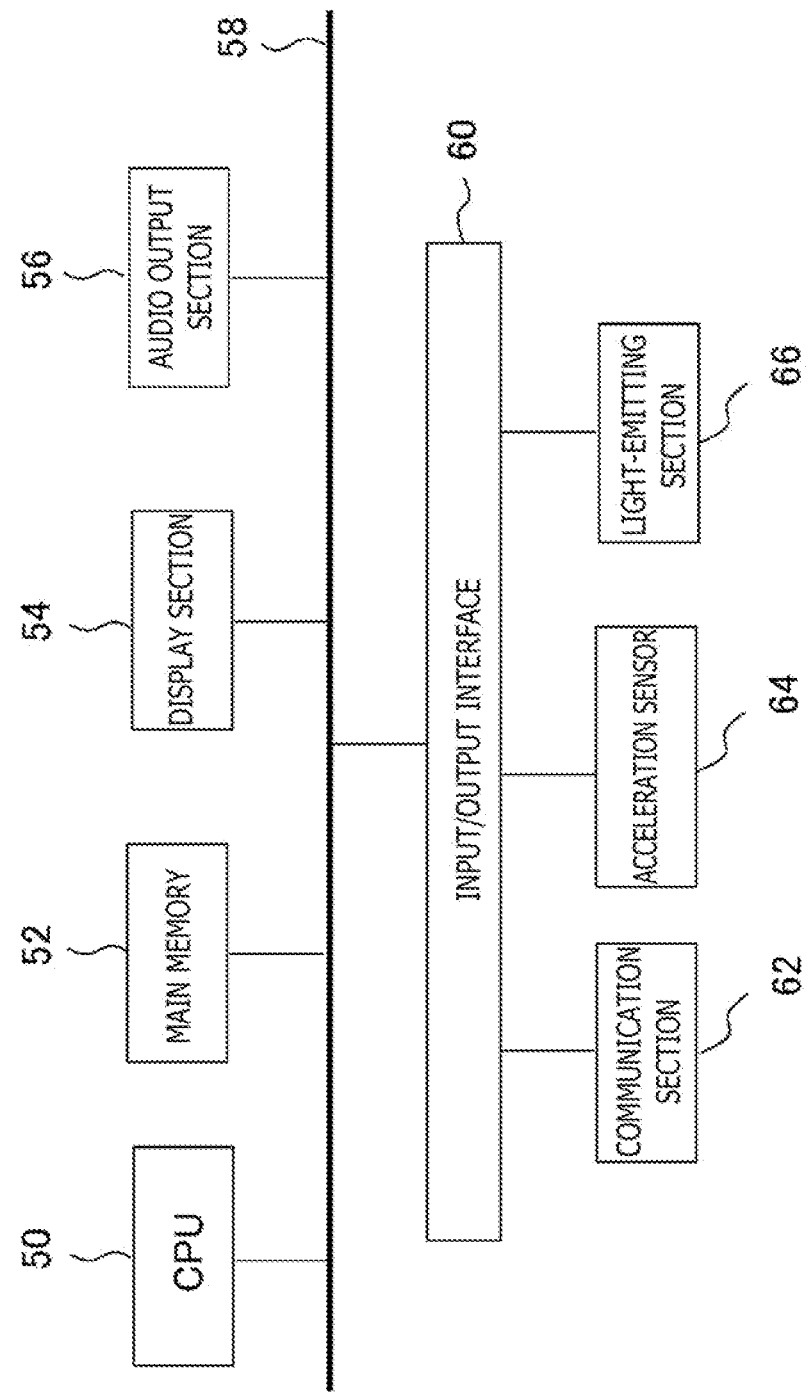
FIG. 4 is a schematic diagram depicting an internal circuit configuration of the HMD of the embodiment.

FIG. 4 depicts an internal circuit configuration of the HMD 18. The HMD 18 includes a CPU 50, a main memory 52, a display section 54, and an audio output section 56. These sections are interconnected via a bus 58. The bus 58 is further connected with an input/output interface 60. The input/output interface 60 is connected with a communication section 62 formed by a wired or wireless LAN network interface, an acceleration sensor 64, and a light-emitting section 66.

The CPU 50 processes information acquired from the sections of the HMD 18 via the bus 58 and supplies output data to the display section 54 and to the audio output section 56. The main memory 52 stores the programs and data needed by the CPU 50 for the processing. However, depending on the design of the application to be executed or of the apparatus to be used, the HMD 18 need only output the data forwarded from the information processing apparatus 10 that performs almost all processing involved. In this case, the CPU 50 and the main memory 52 may be replaced with simpler devices.

The display section 54, made up of a display panel such as a liquid crystal display panel or an organic EL panel, displays images before the eyes of the user wearing the HMD 18. As mentioned above, a pair of parallax images may be displayed in two display regions corresponding to the right and left eyes so as to present a stereoscopic view. The display section 54 may further include a pair of lenses positioned between the display panel and the user's eyes when the user wears the HMD 18, the lenses serving to widen the viewing angle of the user.

The audio output section 56, made up of speakers or earphones positioned corresponding to the user's ears when the HMD 18 is worn, provides the user with sounds. The number of output audio channels is not limited in particular. The channels may be monaural, stereo, or surround. The communication section 62 acts as an interface that exchanges data with the information processing apparatus 10 or with the flat-screen display 16. For example, the communication section 62 may be implemented using known wireless communication technology such as Bluetooth (registered trademark).

The acceleration sensor 64 detects the inclination of the HMD 18 by measuring gravitational acceleration in a given axis direction. The HMD 18 may also be equipped with other sensors including a gyro sensor. Measurements acquired by the sensors are transmitted to the information processing apparatus 10 via the communication section 62. The light-emitting section 66 is a light-emitting element or an aggregate of light-emitting elements. As depicted in FIG.

2, the light-emitting elements are attached to multiple locations on the external surface of the HMD 18. The light-emitting elements are tracked as markers in order to acquire the position of the HMD 18. Also, the posture of the HMD 18 is acquired from the number of light-emitting element images and their positional relations to each other in a captured image.

The information processing apparatus 10 acquires the position and posture of the user's head with higher accuracy by integrating information obtained from multiple means such as the acceleration sensor 64 and the light-emitting section 66. In some cases, the acceleration sensor 64 may be omitted with this embodiment.

Figure 5:
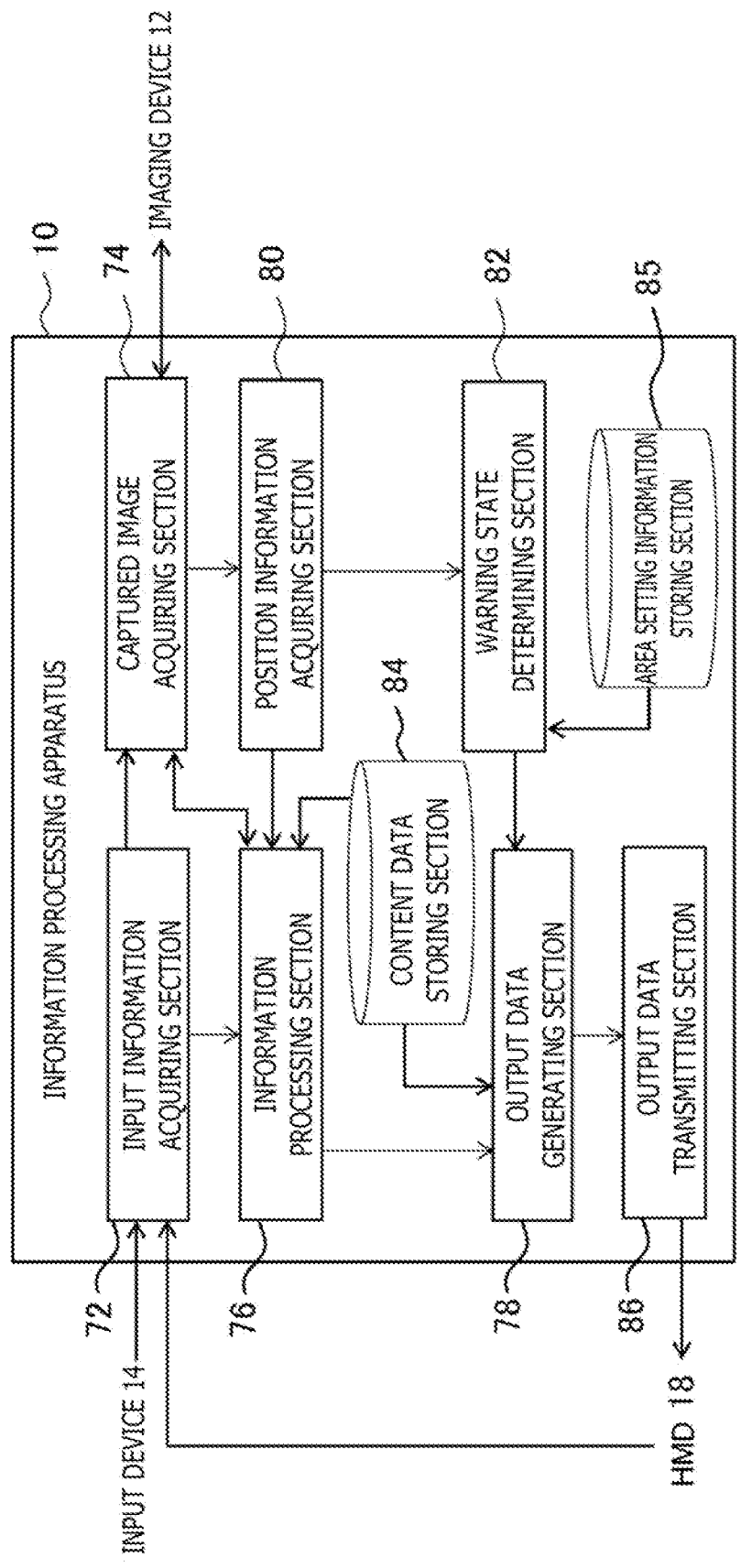
FIG. 5 is a schematic diagram depicting a functional block configuration of the information processing apparatus of the embodiment.

FIG. 5 depicts a functional block configuration of the information processing apparatus 10. The functional blocks depicted in FIG. 5 may be configured by hardware using the CPU, GPU, memories, and data bus depicted in FIG. 3 for example, or by software using programs that are typically loaded from recording media into memory to implement such functions as data input, data retention, image processing, and communication. It will thus be appreciated by those skilled in the art that these functional blocks are configured by hardware only, by software only, or by a combination thereof in diverse forms and are not limited to any one of such forms.

The information processing apparatus 10 includes an input information acquiring section 72 that acquires input information from the input device 14 and from the HMD 18, a captured image acquiring section 74 that acquires captured image data from the imaging device 12, an information processing section 76 that performs information processing in keeping with content such as video games, an output data generating section 78 that generates data to be output, and a content data storing section 84 that stores the data necessary for information processing and image generation. The information processing apparatus 10 further includes a position information acquiring section 80 that acquires the position information about the user on the basis of captured images, a warning state determining section 82 that determines the state that requires a warning on the basis of the user's position, an area setting information storing section 85 that stores setting information about real space areas necessary for the determination, and an output data transmitting section 86 that transmits output data to the HMD 18.

The input information acquiring section 72 acquires the content of the user's operations from the input device 14. The user's operations in this case may include selection of the application or the content to be executed, start and end of processing, input of commands, and other operations performed on common information processing apparatuses. The input information acquiring section 72 supplies the information acquired from the input device 14 either to the captured image acquiring section 74 or to the information processing section 76 depending on the content of the acquired information. Furthermore, the input information acquiring section 72 receives measurements from the acceleration sensor 64 of the HMD 18 and forwards the received measurements to the information processing section 76.

The captured image acquiring section 74 acquires at a predetermined rate the data of captured images such as stereoscopic images obtained by the imaging device 12 through video imaging. The captured image acquiring section 74 may further control the start and end of the imaging by the imaging device 12 in accordance with process start/end requests acquired by the input information acquiring section 72 from the user, or may control the type of data to be acquired from the imaging device 12 in keeping with the result of the processing by the information processing section 76.

The position information acquiring section 80 acquires at a predetermined rate the position information about the user by detecting images of a predetermined target object from the captured image. For example, the position information acquiring section 80 acquires the positions of the user's head and hands in real space on the basis of the images of the light-emitting markers attached to the HMD 18 or to the input device 14. The position information acquiring section 80 may also utilize image analysis techniques in combination. Using the techniques, the position information acquiring section 80 may track a part of the user's body by its contours or recognize the face or the target object with specific patterns through pattern matching. Depending on the configuration of the imaging device 12, the position information acquiring section 80 may identify the distance to the user by measuring reflected infrared rays as mentioned above.

The information processing section 76 processes electronic content such as video games designated by the user. The processing includes the use of the user position information acquired by the position information acquiring section 80. The information processing section 76 may identify the user's posture by integrating, as needed, the measurements from the acceleration sensor of the HMD 18 for example. As mentioned above, there are no particular constraints on the content of downstream information processing to be performed by the information processing section 76 in response to the user's operations or movements given by way of the input device 14.

In accordance with requests from the information processing section 76, the output data generating section 78 generates video and audio data to be output as a result of information processing. For example, the output data generating section 78 generates, as right and left parallax images, a virtual world seen from the point of view corresponding to the position and posture of the user's head. When presented with the parallax images before the eyes in the HMD 18 together with audio output from the virtual world, the user gets the sensation that he or she is actually in the virtual world. The content data storing section 84 stores the programs and the video and audio data necessary for information processing by the information processing section 76 and for data generation processing by the output data generating section 78.

The warning state determining section 82 continuously monitors and determines the occurrence of the state that needs a warning on the basis of the user position information acquired by the position information acquiring section 80. Specifically, the warning state determining section 82 performs inside/outside determination on a play area set directly or indirectly in a three-dimensional space of the real world, and determines that a warning is needed if the user is found outside of the play area. With this embodiment, the position information is acquired using the captured image. That means the information processing is predicated on the assumption that the user is inside the angle of view of the camera.

However, the user wearing the HMD as depicted in FIG. 2 has difficulty in recognizing the surroundings or realizing whether he or she is in the angle of view. In order to continue normal information processing, it is necessary to provide the user with information about the real world through some means at the risk of spoiling the world view represented by the content. One way of overcoming this predicament is to issue a warning to the user only when the user is about to go out of the angle of view. The timing of issuing a warning, if too early, can trigger frequent warnings that will narrow a movable range in which the user can effectively move about. But if the timing is too late, the user cannot be warned against getting out of the angle of view. This can result in a time period in which the position information is not available.

With this embodiment, as described above, the inside/outside determination is carried out on the area set as the play area in the real world in order to determine the timing of issuing a warning. Furthermore, the relations between the play area and the angle of view are adjusted in a manner optimizing the balance between the movable range and the accuracy of processing under the circumstances. The setting information about the play area is stored beforehand in the area setting information storing section 85. Specific setting details will be discussed later. Upon determining that a warning is needed, the warning state determining section 82 notifies the output data generating section 78 to that effect.

At this point, the output data generating section 78 additionally renders in the display image a component image indicative of the warning. When determining that there is no need for the warning because the user has returned to the normal position for example, the warning state determining section 82 notifies the output data generating section 78 to that effect. In response, the output data generating section 78 causes the component image indicative of the warning to disappear. The warning as an image may be accompanied by a sound. The output data transmitting section 86 successively acquires the output data generated by the output data generating section 78 and, after processing the data as needed, transmits the data to the HMD 18.

Figure 6:
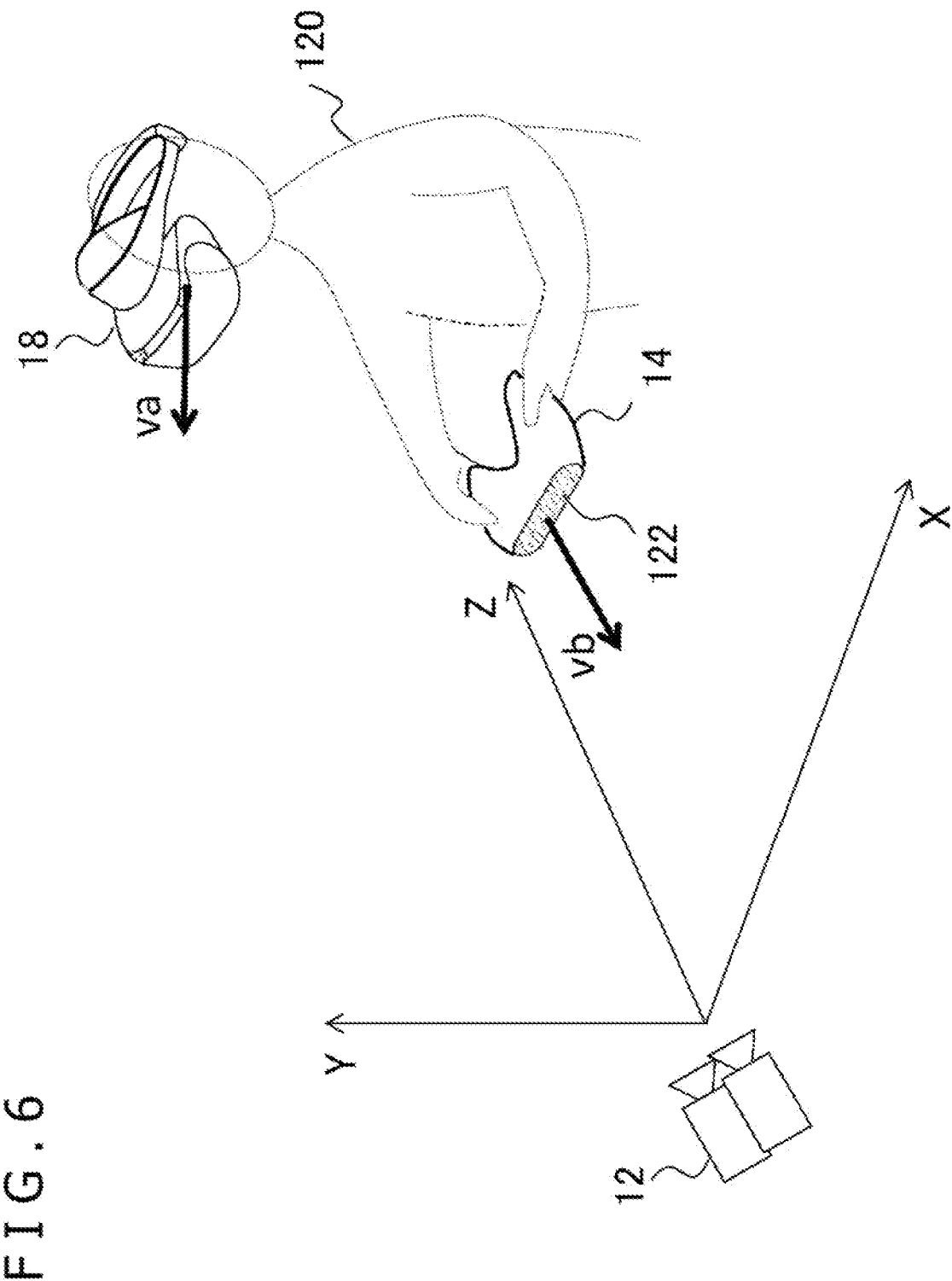
FIG. 6 is an explanatory diagram explaining information obtained by the embodiment from captured images.

FIG. 6 is an explanatory diagram explaining information obtained by the embodiment from captured images. In FIG. 6, a user 120 holds the input device 14 by hand and wears the HMD 18. The input device 14 is equipped with light-emitting markers 122 which, when the device is held in a manner suitable for the operation, face straight at the imaging device 12. The light-emitting markers of the HMD 18 are configured as depicted in FIG. 2. If the imaging device 12 is a stereo camera, a distance Z from an imaging surface of the imaging device 12 to each light-emitting marker is obtained on the basis of the parallax between the images making up a stereoscopic image. The position of a light-emitting marker image on an image plane (X-Y plane) of either the right or the left captured image represents the apparent marker position from the imaging device 12.

The position that integrates these pieces of information, i.e., the position on the X-Y plane specifically, is inversely projected using the distance Z from the imaging device 12 in order to find the position of each light-emitting marker in the three-dimensional space of the real world. Furthermore, the number of images of the light-emitting markers on the HMD 18 and the positional relations between these images are used to obtain the posture of the HMD 18 in the real space (vector va). The configuration of the images of the light-emitting markers 122 on the input device 14 is used to obtain the posture of the input device 14 in the real space (vector vb).

On the basis of the positions and postures of these devices in the real space, the information processing section 76 in the information processing apparatus 10 can represent a virtual world of which the field of view varies with the direction of the face of the user 120 or depict the manner in which an object in the image moves in keeping with the movement of the input device 14. If the distance from the imaging device 12 is estimated using the apparent sizes of the markers or if the information processing to be carried out has no need for movements in the depth direction, the imaging device 12 need not be a stereo camera. The same also applies where distance measurement techniques making use of reference light are adopted. It may not be necessary to track both the HMD 18 and the input device 14 at the same time.

Where light-emitting marker images are used as described above, what is directly acquired are the positions of the light-emitting markers on the HMD 18 and input device 14, to be exact. However, since the user wears the HMD 18 on the head, the position of the HMD 18 may be regarded as that of the user's head. When position identification is performed on the basis of objects other than the light-emitting markers, the positions of these objects are first obtained, strictly speaking. Information about these positions is then used to estimate the user's center of gravity, for example.

In the description that follows, the wording "user's position" may be interpreted to be either the position of the user or that of the object serving as the basis for user position acquisition. The criteria for inside/outside determination may be provided in a manner reflecting the nature of the object and the circumstances. For example, it may be determined that there is no need for a warning if the HMD 18 is inside the play area even though the input device 14 is outside of it.

Figure 7:
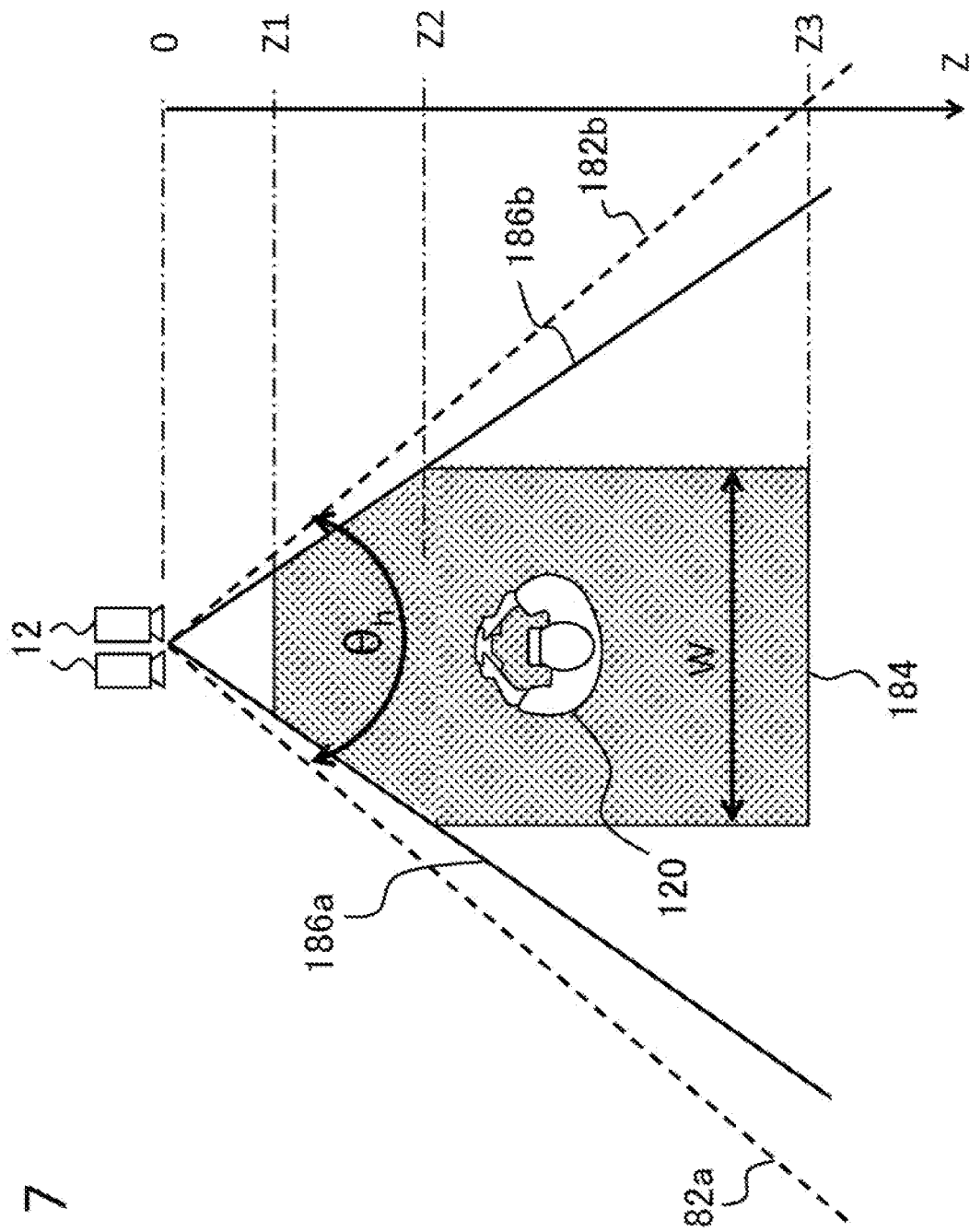
FIG. 7 is a schematic diagram depicting how to set a typical play area to be referenced by a warning state determining section of the embodiment determining the need to issue a warning.

FIG. 7 schematically depicts how to set a typical play area to be referenced by the warning state determining section 82 determining the need for a warning. The drawing overlooks a real space in which the user 120 faces straight at the imaging device 12. A horizontal angle of view $\theta_h$ of the camera in the imaging device 12 determines boundary surfaces 182a and 182b of the field of view indicated by dotted lines. In the case of a stereo camera, the boundary surfaces are a product set of the fields of view of the two component cameras making up the stereo camera. These boundary surfaces in the vertical direction of the field of view are used as the criteria for setting the boundary surfaces of a play area 184 on the basis of predetermined rules. When the user is found outside of the play area 184, the warning state determining section 82 determines that there is a need for a warning.

In the illustrated example, where the distance Z from the imaging device 12 falls in a range of $Z1 \leq Z < Z3$, the play area 184 is set inside the boundary surfaces 182a and 182b of the field of view. In a range of $Z1 \leq Z < Z2$ closer to the imaging device 12, the play area 184 is widened centering on the optical axis of the camera in proportion to the distance Z. In a range of $Z2 \leq Z < Z3$, the play area 184 is set to have a constant width W. Vertical surfaces 186a and 186b determining the play area boundaries in the range of $Z1 \leq Z < Z2$ correspond to the image formation positions located inside of the right and left edges of the captured image by predetermined amounts regardless of depth-direction positions. Thus when the play area is set at least inside the vertical surfaces 186a and 186b, the predetermined amounts above serve as margin areas of the image. This makes it possible to issue a warning well before the user gets out of the angle of view.

The closer the user is to the imaging device 12, the narrower the field of view becomes, which makes the user's movable range narrower. For this reason, where the imaging device 12 is nearby, the range in which a warning is not necessary is widely set aside by maximally taking advantage of the condition that the play area is to remain inside the vertical surfaces 186*a* and 186*b*. Where the imaging device 12 is away from the user, the field of view is widened. In this case, if the criteria involve determining whether the user is outside of the angle of view and if the play area is set within the vertical surfaces 186*a* and 186*b*, then it is unnecessary to issue a warning in a wider range. In the illustrated example, however, the play area is restricted in a smaller width W in consideration of the suitability of information processing and the presence of obstacles in the surroundings.

As described above, the play area 184 serves two purposes: to reduce the possibility of deviation from the angle of view, and to establish an appropriate movable range. When the play area is set according to different rules depending on the distance from the camera, priorities may be changed adaptively. For example, where the field of view is narrower, the movable range may be given priority. Where the field of view is wider, priority may be given to other factors such as the nature of content.

Figure 8:
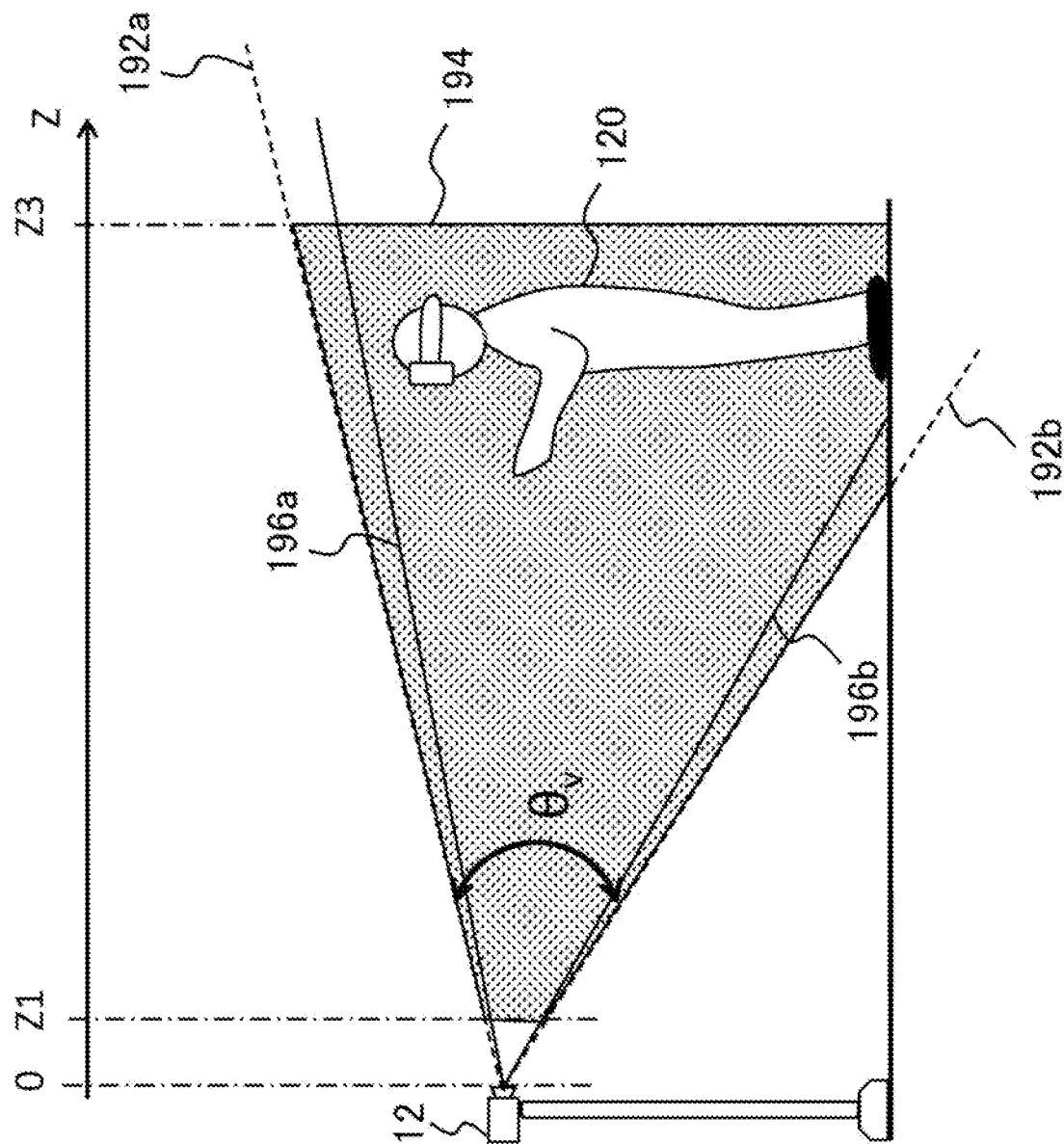
FIG. 8 is a schematic diagram depicting how to set another typical play area for the embodiment.

FIG. 8 schematically depicts how to set another typical play area. This drawing depicts a real space as seen from the left side of the user 120 facing straight at the imaging device 12. A vertical angle of view $\theta_v$ of the camera in the imaging device 12 determines boundary surfaces 192*a* and 192*b* of the field of view indicated by dotted lines. Theses boundary surfaces in the horizontal direction of the field of view are used as the criteria for setting play area boundary surfaces where the distance Z from the imaging device 12 falls in the range of $Z1 \leq Z < Z3$.

In the example of FIG. 8, the boundary surfaces 192*a* and 192*b* of the field of view are made to coincide with the boundary surfaces of a play area 194 in the range of $Z1 \leq Z < Z3$. That is, compared with the play area depicted in FIG. 7, no margin areas are set between the play area boundary surfaces and the boundary surfaces of the field of view. That is, the area corresponding to between the upper and the lower edges of the captured image is set as the play area, with no margin areas of predetermined amounts inside the upper and the lower edges of the captured image such as horizontal surfaces 196*a* and 196*b* within which images are formed. These settings enable a warning to be issued the moment the user gets out of the angle of view. This raises the possibility that position acquisition is disabled even for an infinitesimal time period. On the other hand, there is no need to issue a warning over a wider range.

The settings above are effective for cameras having narrower angles of view. If the angle of view is limited and if the margin areas are set as depicted in FIG. 7, even small movements can trigger frequent warnings. Thus priority may be given to the user's comfort by setting aside a wide play area at the expense of somewhat worsening accuracy of information processing. For example, if the camera in use has a wide horizontal angle of view and a narrow vertical angle of view, the positional relations of the play area boundary surfaces to the boundary surfaces of the field of view may be varied depending on the direction in the real space as depicted in FIGS. 7 and 8. This provides a comfortable balance between the accuracy of information processing and an agreeable operating environment.

Figure 9:
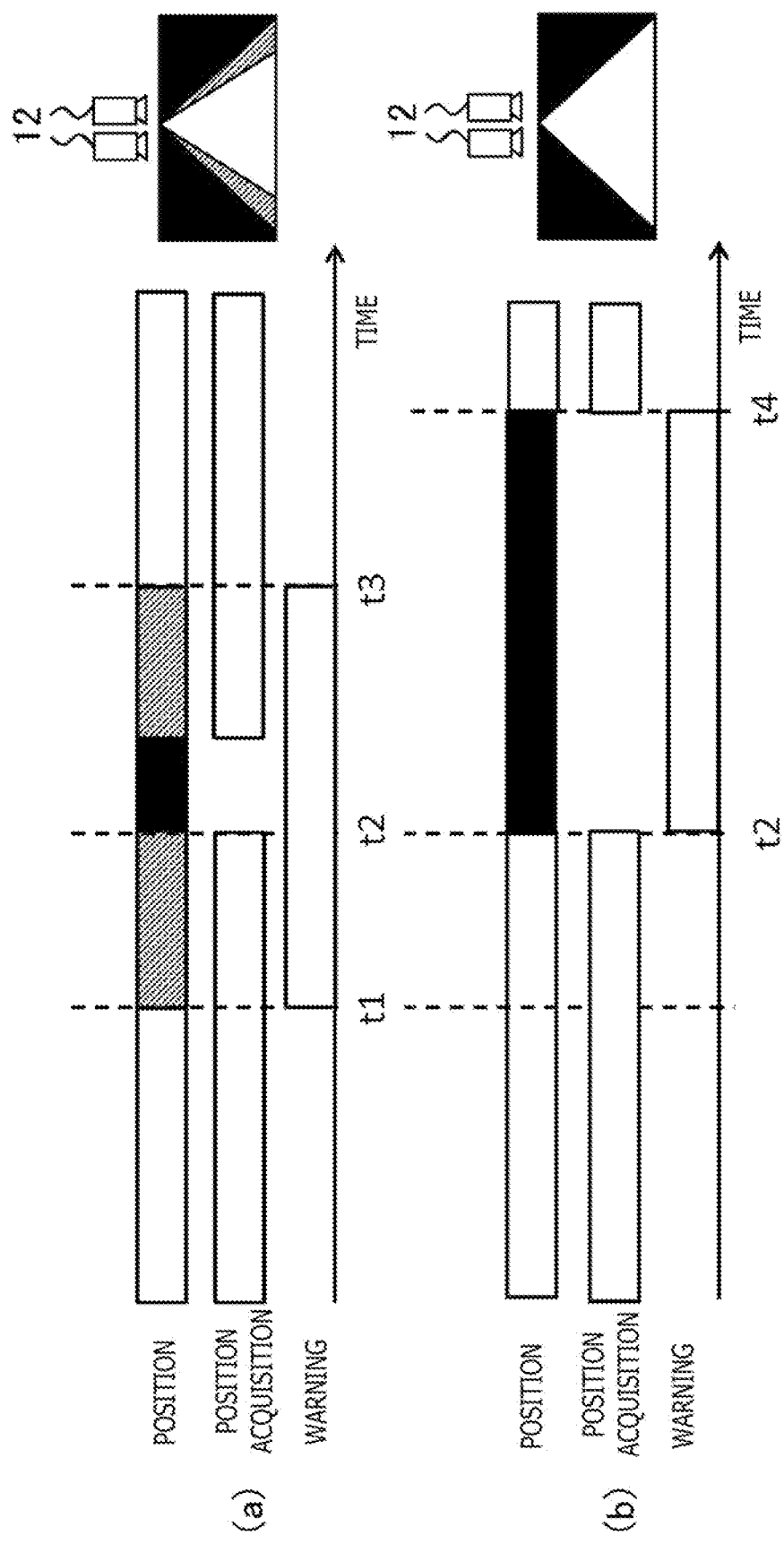
FIG. 9 is an explanatory diagram explaining how the presence or absence of margin areas affects the processing with the embodiment.

FIG. 9 is an explanatory diagram explaining how the presence or absence of margin areas affects the processing. Subfigure (a) in the upper part of FIG. 9 is a timing chart depicting the user's movements and the processes involved when the play area is set together with margin areas appropriated in the field of view. Subfigure (b) in the lower part of FIG. 9 is a timing chart of the user's movements and the processes involved when the play area is set to coincide with the field of view. As depicted schematically on the right, the play area is set as a white space relative to the imaging device 12. In Subfigure (a), there are provided margin areas depicted hatched between the white play area and the black areas outside the field of view. In the timing charts, white, hatched, and black rectangles in a "position" tier represent the time periods in which the user is in the play area, in the margin areas, and outside of the field of view, respectively.

For comparison of the two timing charts, it is assumed that the user gets out of the field of view at time t2 and that at the display of the warning for the same time period, the user returns to the play area. With such movements of the user, a "position acquisition" tier depicts rectangles indicative of the time periods in which the position information acquiring section 80 can acquire position information, and a "warning" tier depicts rectangles indicative of the time periods in which a warning is displayed. In the case of (a), the user gets out of the play area at time t1 earlier than time t2 at which the user gets out of the field of view. Thus the warning is displayed from time t1 to time t3, the user returning to the play area at time t3. In the case of (b), on the other hand, no margin areas are set, so that the warning is displayed from time t2 to time t4, during which the user is outside of the field of view.

In the case of (a), as indicated, the position information is acquired even after the warning is displayed. The position information thus serves as the basis for ensuring the validity of the warning against the user being outside of the play area. In the case of (b), the position information becomes unavailable the moment the warning is issued. That means the validity of the warning is not guaranteed during the period where the warning is being displayed. For example, if the user's image is not detected on a boundary of the field of view typically due to occlusion, it may be falsely determined that the user is outside of the field of view, with the warning displayed erroneously.

Even if the user returns to the play area at the same time as the display of the warning in the cases of (a) and (b), the time period in which the position information remains unavailable is longer in the case of (b). In the case of (a) in the illustrated example, there occurs a time period in which the user is out of the field of view but there is a possibility that the user may return to the play area in response to the warning display before getting out of the field of view depending on the width of the margin areas. That means the time period in which position information cannot be acquired is less likely to occur in the case of (a) than in the case of (b). On the other hand, constraints are more stricter on the user in the case of (a) because the warning is displayed at time t1, earlier than in the case of (b), with the user moving in like manner in both cases. It is thus preferred that with these characteristics taken into account, an optimum play area be set on a case-by-case priority basis. For example, the priority may be to maximize the areas where no warning is needed, or may be to determine that the play area has room enough without resorting to such area maximization.

In addition to determining whether or not to provide the margin areas, the width of the margin areas and the shape of the play area may be optimized in keeping with the expected circumstances or the direction in the real space. For example, given the same angle of view, the shape of the play area may be varied depending on the user's presumed posture in accordance with the nature of content such as that of a video game and the environment related thereto. Specifically, the play area may be set differently depending on whether the user plays the game while standing or sitting and, if sitting, whether the user is sitting in front of a table or on a sofa, for example.

Where the settings of FIGS. 7 and 8 are applied at the same time, the play area to be set has a rectangular cross-section relative to the distance Z from the camera. However, this is not limitative of this embodiment; the play area may be set to have other cross-sections such as a cylindrical cross-section. If the optical axis is not horizontal, the distance Z from the camera is not in parallel with the floor surface. In this case, the shape of the play area may be defined using the distance in the optical axis direction or in the horizontal direction in the real space. If the angle formed between the optical axis of the camera and the horizontal surface of the real space is measured using the acceleration sensor in the imaging device 12 for example, coordinate transformation is implemented with ease. It will be understood by those skilled in the art that there are diverse specific data formats for setting up areas in the three-dimensional space.

Figure 10:
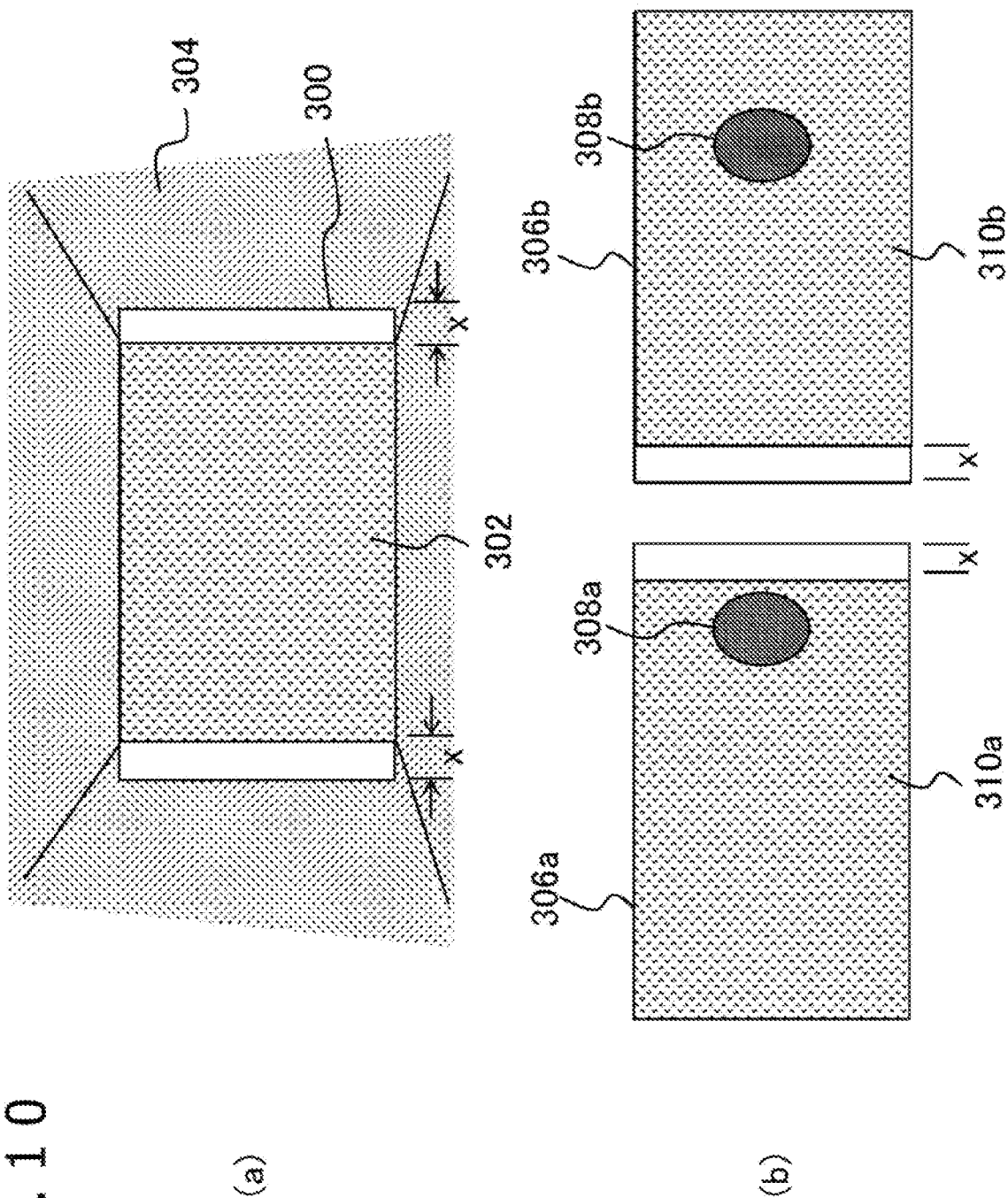
FIG. 10 is an explanatory diagram explaining a method of setting the play area on an image plane with the embodiment.

Meanwhile, the play area may be indirectly set by defining a corresponding area on an image plane. FIG. 10 is an explanatory diagram explaining a method of setting the play area on an image plane. This drawing depicts the field of view of the camera facing an object space as well as the plane of a captured image. The upper Subfigure (a) applies to the case of a monocular camera and the lower Subfigure (b) to the case of a stereo camera. On the plane of a captured image 300 given by the monocular camera, the right and left image edges having a width x each are defined as margin areas. An area 302 minus the margin areas is defined as a play area correspondence area.

A three-dimensional space area defined by the area 302 is an area 304 of which the horizontal width increases in proportion to the distance Z in the depth direction. That is, where the horizontal direction is considered, setting up the area 302 is equivalent to setting the play area inside the vertical surfaces 186a and 186b depicted in FIG. 8. When the play area correspondence area 302 is set on the image plane as described above, the cross-section of the play area in the real space is analogous to the size reflecting the distance Z. This results in a lower degree of freedom in setting the play area than when the play area is set directly in the real space.

On the other hand, it is possible directly to determine the need for a warning by performing inside/outside determination on the target image in the captured image with respect to the play area correspondence area 302. This leaves less room for error than when the user position information is used. Although the illustrated example depicts the case where the margin areas are set in the horizontal direction, the same applies where the margin areas are set in the vertical direction. Also, for the same reasons mentioned above, the determination of whether or not to set margin areas and, if the margin areas are to be set, the adjustment of how large the margin width x is to be may be carried out independently for each direction. These factors may also be varied depending on the nature of content and the related state.

In the case of the stereo camera depicted in Subfigure (b) above, depending on whether the user is near the left ledge or the right edge of the camera field of view, a different component camera in the stereo camera first loses the user from its field of view. For example, if the user is near the right edge of the camera field of view, an image 308a in an image 306a of the left viewpoint camera is closer to the right image edge than an image 308b in an image 306b of the right viewpoint camera, as illustrated. Thus if the user keeps moving to the right, the left viewpoint camera first loses the user from its field of view. Conversely, if the user is near the left edge of the camera field of view, the right viewpoint camera first loses the user from its field of view.

Thus if the play area is to be set in the field of view covered by both component cameras of the stereo camera, two play area correspondence areas are to be set simultaneously: an area 310a on the captured image plane of the left viewpoint camera minus the right-edge margin area having the width x, and an area 310b on the captured image plane of the right viewpoint camera minus the left-edge margin area having the width x. At the time the user's image is outside of either of the two play area correspondence areas, the need for a warning is determined.

Figure 11:
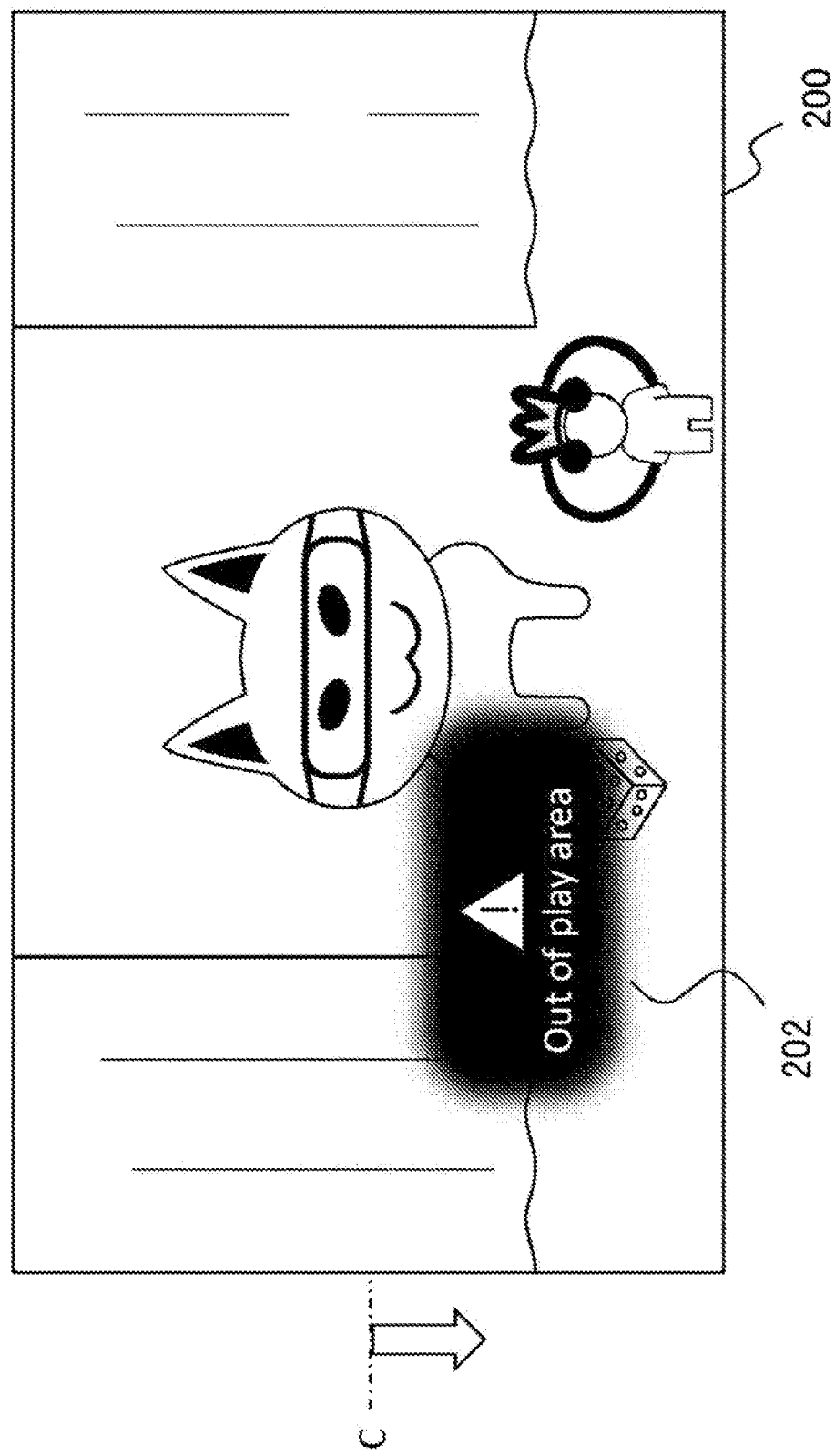
FIG. 11 is a schematic diagram depicting a display screen generated by the embodiment determining that a warning is needed.

FIG. 11 depicts a display screen generated by the warning state determining section 82 determining that a warning is needed. A display screen 200 is configured to add a warning image 202 indicative of a warning onto the content image such as a game screen. In the illustrated example, the warning image 202 indicates that the user is outside of the play area with text information "Out of play area." A mark indicative of danger is further included to represent urgency.

However, this example is not limitative of how the warning image 202 is to be set. With its color and its shape elaborated as needed, the warning image 202 may be displayed as a shape or a mark alone or as a combination of such shape and/or mark and text information. As another alternative, the warning image 202 may be varied from one content to another or in keeping with the ongoing display details. Because of its role of reminding the user, the warning image 202 is basically superposed on the content image. On the other hand, when the content image constitutes a virtual world with a sense of depth, the user might be surprised or irritated if a component image with no sense of depth suddenly appears before the eyes.

In order to avoid such unpleasantness, the contours of the warning image 202 may be softened by blurring or by a blending, for example. Alternatively, the entire warning image 202 may be made translucent. These measures help to enhance the affinity of the warning image in the foreground with the virtual world in the background. Also, the warning image is preferably displayed at a position away from the point view so that the user will not experience a sudden disruption of the line of sight. For example, if the display is such that the field of view is varied in accordance with the user's line of sight, the point of view is inevitably fixed at the screen center. In such a case, the warning image 202 is displayed at least a predetermined distance away from the screen center.

Also, since people can look down more easily than look up, the warning image 202 may be displayed in the lower half region of the display screen (the screen region below a horizontal center line C), without recourse to the elaborate mode of display. The user can then move his or her point of regard effortlessly from the content image to the warning image. These measures contribute to suppressing situations where the user needs to take time to focus on an image that has suddenly appeared or where forced small eyeball movements make the user feel sick.

Figure 12:
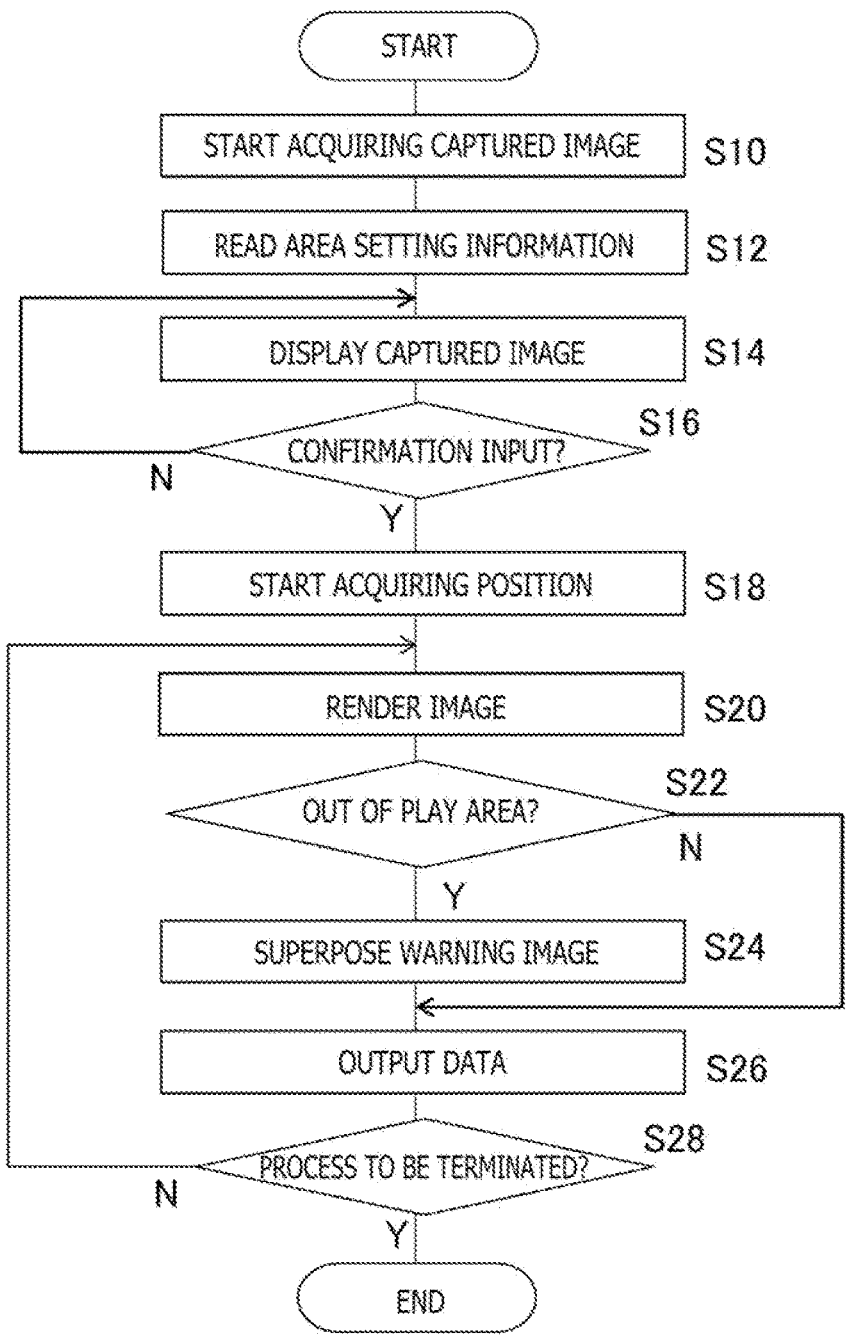
FIG. 12 is a flowchart depicting a procedure by which the information processing apparatus of the embodiment generates output data in keeping with the user's movement.

Explained below is the operation of the information processing apparatus 10 implemented using the configuration discussed above. FIG. 12 is a flowchart depicting a procedure by which the information processing apparatus of the embodiment generates output data in keeping with the user's movement. The process of this flowchart is started when the user sends a process start request to the information processing apparatus 10 via the input device 14, for example.

First, the captured image acquiring section 74 of the information processing apparatus 10 requests the imaging device 12 to start imaging, and starts acquiring the data of the image captured and output by the imaging device 12 (S10). Meanwhile, the warning state determining section 82 reads setting information about the play area from the area setting information storing section 85 (S12). At this time, the warning state determining section 82 may select the setting information associated with the content which, selected by the user for example, is to be carried out. The warning state determining section 82 may also select the setting information on the basis of such information as whether the user is sitting and how the surroundings of the user are arranged through analysis of the captured image, for example.

Next, the information processing section 76 requests the output data generating section 78 to output to the HMD 18 the image captured in real time by the captured image acquiring section 74. Having the captured image displayed on the HMD 18 prompts the user to confirm that there are no obstacles nearby (S14 and S16). At this point, the output data generating section 78 superposes on the captured image such text information as "Are there any obstacles?" and a graphic user interface (GUI) through which the user inputs the confirmation. This enables the user to recognize the angle of view of the camera in advance and allows the user to move in a manner keeping the play area correspondence area always in mind.

Knowing the play area beforehand clarifies the movable range for the user. It is also possible for the user to determine whether there are any obstacles nearby. With any obstacles removed by the user as needed, the process is allowed to proceed on condition that the confirmation be input by the user. This accomplishes two things simultaneously: to monitor the user's deviation from the camera field of view, and to look out for collision with obstacles. As long as there is no input of the user's confirmation, the captured image is displayed continuously (N in S16 and S14).

When the user's confirmation is input (Y in S16), the position information acquiring section 80 starts acquiring the position information about the user on the basis of the captured image (S18). The information processing section 76 performs information processing using the acquired information. As a result of the information processing, the output data generating section 78 renders a content display image (S20). Meanwhile, the warning state determining section 82 monitors whether the user is out of the play area (S22). Strictly speaking, the determination that the user is out of the play area is made when the markers attached to the HMD 18 worn by the user or the markers on the input device 14 held by the user are found outside of the play area.

The criteria for the determination may vary depending on the means used for acquiring the user position information. For example, if the position information is acquired by creating a depth map from the user's image in a stereoscopic image, the user may be determined to be out of the play area when the user's center of gravity is found outside of the play area. The same applies when the user's contours are tracked for position information acquisition. If the user position is acquired by tracking the user's face through pattern matching in a face detection process, for example, the user may be determined to be out of the play area when the user's face is no longer recognized.

If the user is not out of the play area (N in S22), the output data transmitting section 86 outputs to the HMD 18 the content image as rendered in S20 (S26). If the user is out of the play area (Y in S22), the warning state determining section 82 notifies the output data generating section 78 to that effect. In turn, the output data generating section 78 superposes a warning image on the content image (S24). The output data transmitting section 86 outputs the image superposed with the warning image to the HMD 18 (S26). In the process of S26, audio data may be output simultaneously.

Unless there is a need to terminate the process such as when a process stop request is made by the user, the content image is rendered on the basis of the position information. As needed, the warning image is superposed on the content image and output to the HMD 18. These steps are repeated at a predetermined rate (N in S28, and S20 to S26). When the need has arisen to terminate the process, the whole process is brought to an end (Y in S28).

Figure 13:
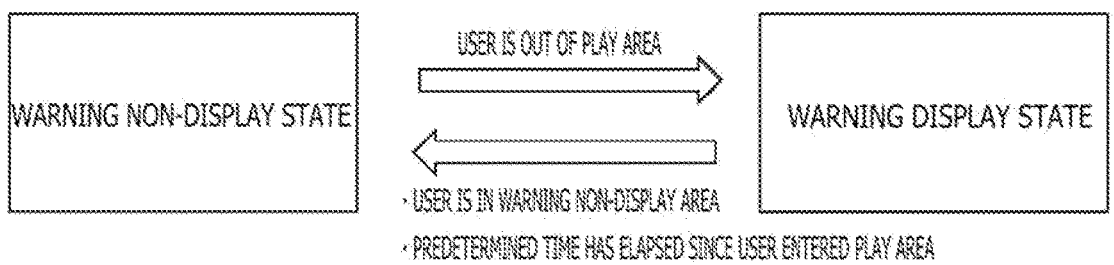
FIG. 13 is a schematic diagram depicting state transitions between display and non-display of a warning image with the embodiment.

In the flowchart of FIG. 12, the period in which the user is out of the play area coincides with the period in which the warning image is superposed. That is, the moment the user returns to the play area, the warning image is caused to disappear. Alternatively, the conditions for causing the warning image to disappear may be established independently of the conditions for displaying the warning image. FIG. 13 schematically depicts state transitions between display and non-display of the warning image. As mentioned above, the determination of the transition from a non-display state to a display state of the warning image is predicated on the user getting out of the play area (right-pointing arrow).

On the other hand, the determination of the transition from a display state to a non-display state of the warning image may be predicated not on the user returning to the play area but on a separately established condition being met (left-pointing arrow). For example, a warning non-display area narrower than the play area may be set aside. When the user enters this warning non-display area, the warning image is not displayed. In another example, the warning image is caused to disappear when a predetermined time has elapsed since the user was in the play area. These measures allow the warning, once displayed, to stay displayed longer. This prevents a "chattering" phenomenon in which the result of the inside/outside determination regarding the play area is varied even by small movements of the user causing the warning to appear and disappear repeatedly when the user is near the play area boundaries, for example.

The above-described embodiment of the present invention constitutes an information processing system that acquires the user position information from the target image in the captured image and performs information processing using the acquired information. The system has the play area set in a three-dimensional space of the real world. If the user gets out of the play area, the system presents the user with the warning display that warns against the deviation. This prevents the user from unknowingly getting out of the camera field of view and disrupting the information processing when the user wearing the HMD is unable to see the outside world or is immersed in the displayed virtual world, for example.

The play area is set in reference to the camera field of view. At this point, several factors are to be optimized: whether the play area is set together with its margin areas within the field of view, whether the play area is set to coincide with the field of view and, if the margin areas are to be included, how much their width is to be. Adjusting the margin areas in this manner is equivalent to establishing an area in which the user can move about without warning, to determining the frequency with which the position information is not available with the user out of the field of view, and ultimately to adjusting the accuracy of position information acquisition. This makes it possible to devise the settings according to priorities, e.g., in such a manner that a maximum movable range is permitted at the expense of slight worsening of the accuracy of position information acquisition, or that the movable range is limited to maintain the accuracy of position information acquisition.

The priorities vary depending on the horizontal/vertical angle of view of the camera, the content of information processing, and the state of the user and that of the user's surroundings, for example. When optimized as described above, the settings permit maintenance of both the accuracy of position information acquisition and the user's comfort. Since the shape of the play area is not limited in particular, suitably setting the shape and size of the play area makes it possible to achieve multiple objectives: to obey the appropriate values of presumed movements of content such as those of a video game and to avoid collision with nearby obstacles, in addition to preventing the user from getting out of the camera field of view.

At the time of displaying the warning, a component image indicative of the warning is superposed on the normal display image such as the game screen. At this point, the contours of the warning image may be blurred or the image may be made translucent in order to improve the affinity of this image with the normal display image. This is intended to reduce the discomfort of the user being suddenly confronted with an unrelated image before the eyes. Also, having the warning image displayed at a predetermined distance away from the point of view or positioned in the lower half of the display screen allows the user to view the image and recognize what is happening without being irritated or feeling sick by disruption of the line of sight.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

REFERENCE SIGNS LIST

8 Information processing system
10 Information processing apparatus
12 Imaging device
14 Input device
16 Flat-screen display
18 HMD
22 CPU
24 GPU
26 Main memory
72 Input information acquiring section
74 Captured image acquiring section
76 Information processing section
78 Output data generating section
80 Position information acquiring section
82 Warning state determining section
85 Area setting information storing section
86 Output data transmitting section

INDUSTRIAL APPLICABILITY

As described above, the present invention is applicable to a game machine, an information processing apparatus, an image display apparatus, and a system that includes any of these apparatuses, for example.

The invention claimed is:
1. An information processing apparatus comprising:
an information processing section configured to perform information processing on the basis of data received from a device that detects a user position;
an image generating section configured to generate an image to be displayed as a result of the information processing; and
a warning state determining section configured to determine that the user needs to be warned when the user position indicates that the user moves out of a play area set in an object space in reference to a detection field of the device, and to cause the image generating section to superpose a warning image on the image to be displayed,
wherein the warning state determining section sets positions of boundary surfaces of the play area with respect to the detection field of the device within a predetermined range from the user.
2. The information processing apparatus of claim 1, wherein the warning state determining section changes play area rules, which serve to establish the play area, depending on a distance between the user position and the device.
3. The information processing apparatus of claim 1, wherein the warning state determining section sets play area shapes of the play area different in a horizontal direction of a real space in which the user is located as compared to in a vertical direction of the real space.
4. The information processing apparatus of claim 1, wherein the warning state determining section does not match the predetermined range and play area.
5. The information processing apparatus of claim 1, wherein the warning image includes at least one of text information, an object shape, and a mark as at least part of the warning image.
6. The information processing apparatus of claim 1, wherein the warning state determining section softens contours of the warning image.
7. The information processing apparatus of claim 1, wherein the warning state determining section locates the warning image for display based on a line of sight of the user.
8. The information processing apparatus of claim 1, further comprising an input device that receives a user operation to start the information processing.
9. The information processing apparatus of claim 1, wherein the information processing section detects the user position by measuring reflected light from the user resulting from reference light incident on the user.
10. The information processing apparatus of claim 1, wherein the device produces an image of the real space and the user, and the information processing section detects the user position by performing information processing on the image.
11. A method, comprising:
performing information processing on the basis of data received from a device that detects a user position;
generating an image to be displayed as a result of the information processing; and
determining that the user needs to be warned when the user position indicates that the user moves out of a play area set in an object space in reference to a detection field of the device, and to cause the image generating section to superpose a warning image on the image to be displayed, wherein the determining includes setting positions of boundary surfaces of the play area with respect to the detection field of the device within a predetermined range from the user.

12. The method of claim 11, wherein the determining includes changing play area rules, which serve to establish the play area, depending on a distance between the user position and the device.

13. The method of claim 11, wherein the determining includes setting play area shapes of the play area different in a horizontal direction of a real space in which the user is located as compared to in a vertical direction of the real space.

14. The method of claim 11, wherein the determining does not include matching the predetermined range and play area.

15. The method of claim 11, wherein the warning image includes at least one of text information, an object shape, and a mark as at least part of the warning image.

16. The method of claim 11, wherein the determining includes softening contours of the warning image.

17. The method of claim 11, wherein the determining includes locating the warning image for display based on a line of sight of the user.

18. The method of claim 11, further comprising receiving a user operation from an input device to start the information processing.

19. The method of claim 11, further comprising detecting the user position by measuring reflected light from the user resulting from reference light incident on the user.

20. The method of claim 11, further comprising producing an image of the real space and the user, and detecting the user position by performing information processing on the image.

21. A non-transitory, computer readable storage medium containing a computer program, which when executed by a computer system, causes the computer system to carry out actions, comprising:
 performing information processing on the basis of data received from a device that detects a user position;
 generating an image to be displayed as a result of the information processing; and
 determining that the user needs to be warned when the user position indicates that the user moves out of a play area set in an object space in reference to a detection field of the device, and to cause the image generating section to superpose a warning image on the image to be displayed,
 wherein the determining includes setting positions of boundary surfaces of the play area with respect to the detection field of the device within a predetermined range from the user.

* * * * *